(12) United States Patent
Becker

(10) Patent No.: US 9,019,286 B2
(45) Date of Patent: Apr. 28, 2015

(54) REMOTE GPU PROGRAMMING AND EXECUTION METHOD

(76) Inventor: Massimo J. Becker, Everett, WA (US)

( * ) Notice: Subject to any disclaimer, the term of this patent is extended or adjusted under 35 U.S.C. 154(b) by 393 days.

(21) Appl. No.: 13/603,282

(22) Filed: Sep. 4, 2012

(65) Prior Publication Data

US 2014/0063027 A1  Mar. 6, 2014

(51) Int. Cl.
  G06F 13/14   (2006.01)
  G06T 1/20    (2006.01)
  G06F 9/54    (2006.01)

(52) U.S. Cl.
  CPC . *G06F 13/14* (2013.01); *G06T 1/20* (2013.01); *G06F 2209/544* (2013.01); *G06F 9/547* (2013.01)

(58) Field of Classification Search
  CPC ........... G06T 1/20; G06F 13/14; G06F 9/547; G06F 2209/541; H04L 67/02; H04L 67/10
  See application file for complete search history.

(56) References Cited

U.S. PATENT DOCUMENTS

| | | | |
|---|---|---|---|
| 8,225,300 B1 | 7/2012 | Webb et al. | |
| 2005/0234928 A1* | 10/2005 | Shkvarchuk et al. | 707/100 |
| 2011/0035736 A1 | 2/2011 | Stefansson et al. | |
| 2011/0035737 A1 | 2/2011 | Stefansson et al. | |
| 2013/0132466 A1* | 5/2013 | Miller et al. | 709/203 |
| 2013/0275492 A1* | 10/2013 | Kaufman et al. | 709/203 |

OTHER PUBLICATIONS

Philip C. Pratt-Szeliga et al, "Rootbeer: Seamlessly using GPUs from Java", 2012 IEEE 14th International Conference on High Performance Computing and Communications, Jun. 25-27, 2012, pp. 375-380, http://ieeexplore.ieee.org/xpls/abs_all.jsp?arnumber=6332196& tag=1.*

Ji et al., *Towards Utilizing Remote GPUs for CUDA Program Execution*, Proceedings of 2011 International Conference on Parallel and Distributed Processing Techniques and Applications (PDPTA), Las Vegas, Nevada, USA, Jul. 18-21, 2011.

\* cited by examiner

*Primary Examiner* — Tize Ma
(74) *Attorney, Agent, or Firm* — Richard C Litman

(57) ABSTRACT

User-specified GPU kernel functions and input data sets are sent over a Web service to a remote computer equipped with a programmable GPU (Graphics Processing Unit) for execution. The Web service then returns resulting data to a client, which uses the same Web service. This is accomplished by incorporating a serialized request formed from the GPU kernel function code and input data set by using JavaScript® Object Notation (JSON) serialization. The request is then sent to the remote computer and programmable GPU, where the request is deserialized, kernel code is compiled, and input data copied to the GPU memory on the remote computer. The GPU kernel function is then executed, and output data is copied from the GPU memory on the remote computer and reserialized using JSON to form a serialized response. The serialized response is then returned to the client via the web service.

8 Claims, 5 Drawing Sheets

CUDA Web Service  Home  Web Client  Tutorial  Configuration  Compute Server/Worker List

CUDA Cloud
Kernel Code

1

Kernel Name

Grid Dimensions
Number of Blocks
X  Y

Block Dimensions
Number of Threads
X  Y  Z

Arguments
Arguments: 0

[Add Argument] [Remove Argument]

Submit
☐ Show JSON Request String
☐ Show JSON Response String
[Launch Kernel]

Fig. 3

| CUDA Web Service | Home | Web Client | Tutorial | Configuration | Compute Server/Worker List |

Available Servers

| ID | URI | Status Path | Execute Path | Status | Last Updated | Update | Delete |
|---|---|---|---|---|---|---|---|
| 1 | http://192.168.0.1:8000 | /status/ | /execute/ | Up | June 11, 2012, 2:43 a.m. | Set Status Up | Remove Server |
| 2 | http://192.168.0.2:8000 | /status/ | /execute/ | Up | June 11, 2012, 2:43 a.m. | Set Status Up | Remove Server |
| 3 | http://www.aworker.com | /anotherstatuspath/ | /anotherexecutepath/ | Up | June 11, 2012, 2:44 a.m. | Set Status Up | Remove Server |

Add New Server

| Server URI | Server Status Path | Server Execute Path | |
|---|---|---|---|
| http://127.0.0.1 | /status/ | /execute/ | Add Server |

*Fig. 4*

REMOTE GPU PROGRAMMING AND EXECUTION METHOD

BACKGROUND OF THE INVENTION

1. Field of the Invention

The present invention relates to remote parallel processing, and particularly to a remote Graphics Processing Unit (GPU) programming and execution method that sends user specified GPU kernel functions and input datasets over a Web service to a remote computer equipped with a programmable GPU for execution.

2. Description of the Related Art

Advances in GPU hardware over the last several years have given rise to the ability to use GPUs for what has become known as general purpose GPU computing. General purpose GPU computing (GPGPU) is the ability to use graphics hardware for general computation in software for financial analysis, physics simulation, alternative graphics rendering, bioinformatics, and other applications that can benefit from a large-scale parallel computing platform.

In the early days of GPGPU computing there were no advanced frameworks that could be applied to general computational problems. The only APIs available to programmers were those used for graphics programming. Due to this limitation, programmers would try to manipulate their computational needs to resemble that of graphics problems. Once the representation of the problem had been manipulated into a new form, the programmer could then use a GPU to accelerate the runtime of their application. This technique added additional complexity and development time for the programmer.

The next logical evolution in GPGPU computing is a framework which allows the programmer to directly represent their problem as one that is solvable utilizing parallel hardware. This level of abstraction is shown in such frameworks as OpenCL, CUDA™, and C++ AMP.

These frameworks allow the programmer to avoid additional complexities when trying to represent problems as graphics problems and instead, represent them in their native form. An added benefit is the generalized representation of the graphics hardware that the framework presents to the programmer.

While the evolution in GPGPUs has developed to a point that makes their use easier for the programmer, there are still some limitations with the existing frameworks for use with GPGPUs. For example, each framework is limited to a few programming languages. Additionally, each framework requires that the hardware it will run on be directly connected to a GPGPU over a high-speed bus. This second limitation is constricting.

The first scenario that shows limitations is one in which the programmer has executed the application on a machine with a GPGPU and now wishes to execute it remotely from another machine. This is to say that the CPU piece of the program will be executed on the local machine, but the GPU piece of the program should be executed on a remote machine that contains a GPGPU. This scenario might occur given that within a small group of machines, there is one machine that contains a GPGPU and many more that do not. Providing that the GPGPU on the single machine is not being fully utilized, it may be beneficial to allow the other machines access to the single GPGPU to increase utilization of the GPGPU.

The second scenario is one in which a programmer has an operation that could be parallelized on a GPGPU device, but where the runtime improvement does not justify the purchase of a GPGPU. In this event it would be beneficial for the programmer to be able to dispatch this parallelizable operation to a remote service or device that contains a GPGPU that can perform the operation.

NVIDIA, a producer of GPU's, offers architectures and frameworks to allow programmers to use their GPUs for general computation. Exemplary NIVIDA GPGPUs include single GPUs connected to programming hardware, and additionally, clusters that include multiple host machines containing one or more GPGPU cards in each machine. These machines are visible to each other over a local network and provide a method for programmers to expand from one GPGPU to multiple GPGPUs within a data center setting. There remains, however, the problem of remotely accessing one or more GPGPUs from outside a data center setting.

Thus, a remote GPU programming and execution method solving the aforementioned problems is desired.

SUMMARY OF THE INVENTION

The remote Graphics Processing Unit (GPU) programming and execution method takes advantage of NVIDIA's CUDA™ (Compute Unified Device Architecture) framework for parallel processing applications utilizing NVIDIA's GPGPUs. CUJDA™ allows the programmer to define and execute functions in multiple threads running on the GPU device. Threads in CUDA™ are organized differently than on the Central Processing Unit (CPU), where multiple threads can share the time of one CPU core. Using CUDA™, one thread will execute for each processing core. Threads are then organized into a block and multiple blocks organized into a grid. As part of the process of executing a CUDA™ program, data that will be operated upon must be copied to the GPU for execution, and then resulting data must be copied back after execution. CUDA™ provides the programmer a unique method for addressing memory on the GPU by giving each thread an index that can be used as a basis for indexing memory on the GPU. This indexing is the basis for dividing large sets of data to be operated on by CUDA™'s massively parallel architecture.

The remote GPU programming and execution system utilizes a Web API (Application Programming Interface) architecture in which any high level language can be used to program and execute a GPGPU, such as a CUDA™ enabled GPU, remotely via the Internet. User-specified GPU kernel functions and input data sets are sent over a Web service to a remote computer equipped with a programmable GPU for execution. The Web service then returns resulting data to a client, which uses the same Web service. Means to accomplish this incorporates a serialized request formed from the GPU kernel function code and input data set by using JavaScript® (JavaScript is a registered trademark of Sun Microsystems, Inc. of Santa Clara, Calif.) Object Notation (JSON) serialization.

The request is then sent to the remote computer and programmable GPU where the request is deserialized, kernel code is compiled, and input data copied to the GPU memory on the remote computer.

The GPU kernel function is then executed and output data is copied from the GPU memory on the remote computer and reserialized using JSON to form a serialized response. The serialized response is then returned to the client via the web service.

These and other features of the present invention will become readily apparent upon further review of the following specification and drawings.

BRIEF DESCRIPTION OF THE DRAWINGS

FIG. 3 is a screenshot showing a web client page in a remote GPU programming and execution system according to the present invention.

FIG. 4 is a screenshot showing a compute server worker list page in a remote GPU programming and execution system according to the present invention.

Similar reference characters denote corresponding features consistently throughout the attached drawings.

DETAILED DESCRIPTION OF THE PREFERRED EMBODIMENTS

The remote GPU programming and execution method provides a Web API architecture in which any high-level language can be used to program and execute a GPGPU remotely via the Internet. Static and dynamic GPU kernel functions are defined by a client, which communicates the kernel functions to a web server. The web server then transmits kernel data to and receives results from the remote GPU via the internet, passing the results back to the client. Serialization and deserialization of GPU kernel instructions, data and data structures are accomplished via JavaScript Object Notation (JSON).

The present system allows programmer specification of dynamic kernel functions during runtime. In addition to the remote execution capability, the present method allow for cross-platform functionality as well as programmer specification of complex data types, such as structs, that kernel functions can use during kernel execution. Moreover, the system provides error reporting in which success or failure of kernel execution is reported back to the client.

Figure 1:
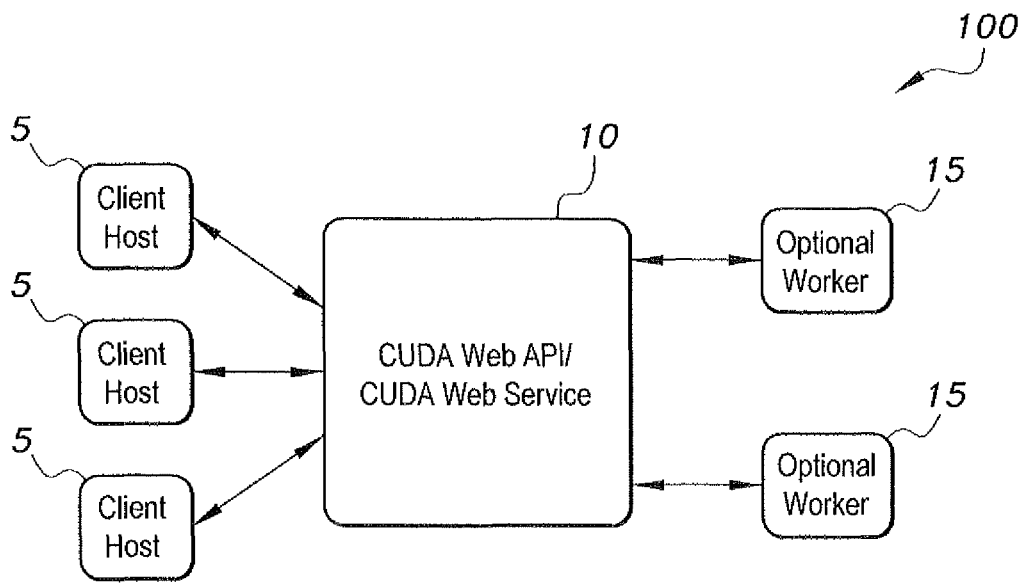
FIG. 1 is a general high-level design block diagram of a remote GPU programming and execution system according to the present invention.

As shown in FIG. 1, the system 100 exposes the CUDA™ framework through a web service 10. Client hosts 5 communicate to the web service 10, while the web service 10 communicates to the workers 15, which are remote GPGPUs. The system 100 contemplates utilization of the CUDA™ Driver API, but not the CUDA™ Runtime API because functionality exposed by the CUDA™ Driver API is available without the use of a CUDA™ compiler and makes it possible to receive kernel functions and execute them at runtime.

First, the client machine builds up a request with a specified structure that is encoded using a serialization library. Because CUDA™ is best suited to process large amounts of data the serialization library has to produce minimal output. For this reason, data is serialized using JSON. Each request consists of a dictionary that contains the kernel code to be executed, a list of the data, and its structure definition (which are passed as parameters to the kernel), and the grid and block sizes of the kernel. The client specifies the kernel function code by sending its standard CUDA™ C representation and data formats, such as C struct definitions, to the web service. The structure definition acts as data contract that specifies what data types will be sent to the web service and which data types will be expected in return. This data contract, used specifically during the deserialization and serialization phases of execution, allows the web service to correctly map the input data to the kernel function and map results back as output data.

The client then establishes a connection to the web service that is connected to a GPGPU, or a set of workers with GPGPUs, and submits the request for execution. Depending upon the implementation, the client either blocks until the request has been finished and a response is returned, or immediately receives an identifier for the request, which can be used to poll for the response of the request. Alternatively, the client may also submit a path to another web server, where a callback can be made giving the response upon completion of the request.

With respect to server processing, once a request is received, the web server validates the request data, ensuring that the JSON structure is correct. During validation, the server immediately notifies the client if any part of the request is invalid or if the JSON format is incorrect. Depending upon the implementation, the web server follows one of two paths. The first path is a single-instance mode that is simpler and does not make use of a work queue. The second is a multi-instance mode that uses a work queue and dispatches workloads from the queue to each worker.

Regarding workers, the server can be configured to distribute requests to remote workers in the event that the server experiences heavy loads or additional compute power is needed. A remote worker is required to have a CUDA™ capable GPU and the same CUDA™ Web API implementation as the server. By having the same implementation as the server, a worker can perform the same execution as the server would when operating without the optional workers.

In a single instance mode without additional workers, a lone server will execute the request and return the result to the client immediately without being stored.

When the server is running in multi-instance mode with workers, a more complex flow is followed to dispatch received requests to workers. The same request validation is performed after receiving a request, as in the single-instance mode. At this point, the request is stored in a work queue to be executed by the workers. A separate process is started at this point to handle dispatching the received request from the work queue and storing the result for later pickup. After the server has placed the request in the work queue and the separate process is running, the server returns a generated ID for the request to the client that can be used when polling for the result.

Figure 2:
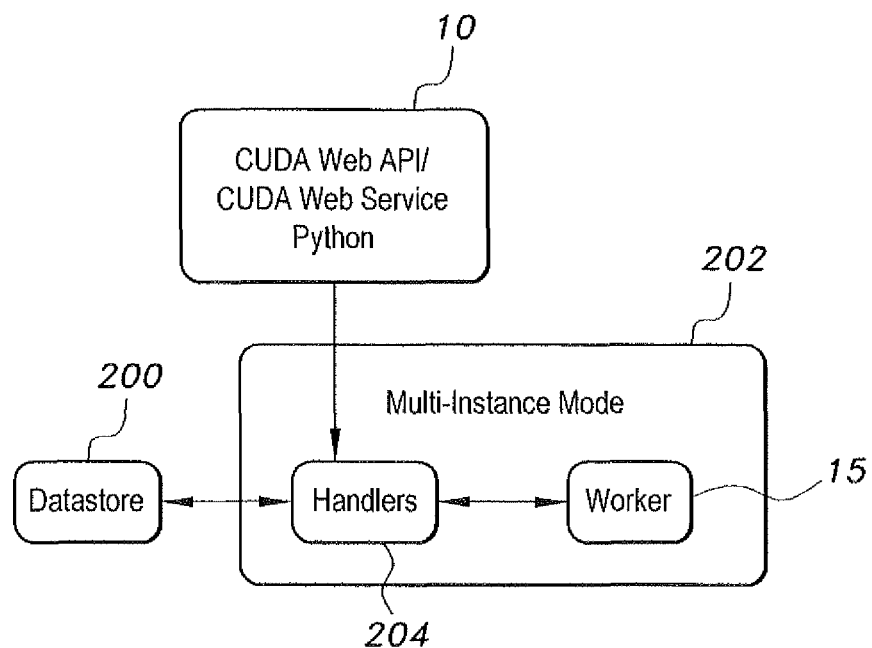
FIG. 2 is a block diagram of a remote GPU programming and execution system according to the present invention with the server operating in a multi-instance mode.

As shown in FIG. 2, multi-instance mode requires the use of a separate process or work queue handler 204 to allow the web server 10 to operate asynchronously and handle web service requests without being interrupted by other tasks. The work handler 204 is responsible for pulling unprocessed jobs from the work queue and sending them to a worker 15 for execution. After pulling requests from the work queue, the work handler 204 serializes them in a format with additional data for parameter deserialization by the worker 15.

The kernel execution phase is the same for both standalone servers and worker execution. Execution begins by reading the request parameters and descrializing each one using the structure definition so that the data is correctly laid out in GPU memory. The structure definition contains a direction parameter that specifies what action must be taken to put the data in memory. Parameters specified as In or InOut must be copied to the GPU before execution while Out parameters only need memory space allocated for resulting data. The kernel code is then compiled using a CUDA™ compiler and the resulting binary is set up on the GPU for execution. The grid and block size is retrieved from the serialized request data and used to specify the grid and block size for the kernel execution. The kernel name that is specified in request data is then executed once all request data has been loaded into its respective place. After execution has finished all parameters marked as Out parameters are copied from the device and serialized. The serialized result is then sent back to the request sender. In the single-instance case, the sender will be a client and in the multi-instance case, the sender is the work handler responsible for dispatch. This process can be done using PyCUDA or another CUDA™ binding library to specify kernel functions and copy data to the GPU.

When the kernel has finished executing, the web service will respond to the host client with a successful result including data or a failure indication. The requirement for remote execution can be met following this process by using a web service in conjunction with GPGPUs.

The request sent from the client to the server is encoded using JSON to minimize the markup sent to the server and decrease server load. JSON allows for dynamic types, but requests in this case must maintain a strict high-level structure while items lower in the structure can be more loosely defined. The top-level item sent in the request is a JSON serialized dictionary containing five keys with a specific data structure mapped to each key. See Table 1 for a list of the keys and their types.

TABLE 1

Request Dictionary Structure

| Key Name | Data Types | Contents |
| --- | --- | --- |
| code | string | CUDA ™ Kernel Code\CUDA ™ C Code defining the kernel function(s) and structs used within kernel functions |
| kernel name | string | The name of the global CUDA ™ kernel to execute (some code sections will have multiple kernels specified; this will decide which kernel to execute) |
| grid | dictionary | A dictionary that contains the grid dimensions for the kernel execution |
| block | dictionary | A dictionary that contains the block dimensions for the kernel execution |
| params | list | A list of dictionary objects with each dictionary representing a parameter and its information |

A request with empty code and kernel name blocks and without any parameters, grid dimensions, or block dimensions is represented as shown in Table 2.

TABLE 2

Example of JSON-Encoded Request

{"code":"","kernelname":"",
"grid":{"x":null,"y":null},
"block":{"x":null,"y":null,"z":null},
"params":[ ]}

TABLE 3

Parameter Dictionary Structure

| Key Name | Data Types | Contents |
| --- | --- | --- |
| data | string | A JSON serialized representation of the data for the parameter |

TABLE 3-continued

Parameter Dictionary Structure

| Key Name | Data Types | Contents |
| --- | --- | --- |
| struct | string | A structure definition defining the type of the data represented in the parameter data field. Similar to a C struct |
| direction | string | Acceptable values: "in", "out", "inout". Describes whether the parameter is input to the function or output from the function. |

The parameters list is a list of dictionary items that represent each parameter and provide some information for the server about how to handle the parameters. See Table 3 for a list of keys and their types. The serialized representation of a parameter's data is a list if a vector or array of data is given. Scalar values are represented as a simple string representation of the value. Data representing an instance of a struct is specified as a list and as such, an array of structs is represented as a list of lists. Multi-dimensional data can be represented as lists of lists, but it may be better for requests to maintain one-dimensional collections of data for simplicity. See Table 4 for examples of parameters and structure definitions.

TABLE 4

JSON-Encoded Parameter Examples

| Code | Parameter |
| --- | --- |
| {"direction"; "in", "data": 9, "struct": "int32"}, | Scalar Parameter - type: int |
| {"direction": "in", "data": 9.0, "struct": "float32"} | Scalar Parameter - type: float |
| {"direction": "in", "data": [1.0, 2.0], "struct": "float32"} | Array Parameter - type: 1D array of floats |
| {"direction": "in", "data": [[1.0, 2.0], [3.0, 4.0]], "struct": "float32"} | Array Parameter - type: 2D array of floats |
| {"direction": "in","data": [[[1.0, 2.0], [3.0, 4.0]], [[5.0, 6.0], [7.0, 8.0]]], "struct": "float32, float32"} | Array Struct Parameter - type: 2D array of structs |
| {"direction": "out", "data": [[0.0, 0.0], [0.0, 0.0]], "struct": "float32"} | Output Parameter - type: 2D array of floats |
| {"direction": "in", "struct": "float32", "size": [2]}, | Empty Output Parameter - type: 1D array of floats |
| {"direction": "in", "struct": "float32", "size": [2, 2]}, | Empty Output Parameter - type: 2D array of floats |

CUDA™ can operate on both integer and floating point numbers and as a result, structure definitions are limited to combinations of type "int" and type "float". Complex structs are specified as a comma (,) separated string of these types. An example of a complex struct definition can be seen in Table 5.

TABLE 5

Example of Complex struct Definition

{"direction": "in",
"data": [[[1, 2.0], [3, 4.0]], [[5, 6.0], [7, 8.0]]],
"struct": "int32, float32"}

Responses from the server are also represented using JSON serialization to minimize data returned to the client. All responses are represented as a dictionary object at the highest level. The response structure depends on the successful execution of the request. Successful execution of the request gives a dictionary with multiple keys representing the resulting data and any meta data regarding the execution. Resulting data is returned in a JSON list with each item in the list representing a resulting data set. Each data set within this list has its own representation based on the struct specification given in the request structure. Output data sets are created depending on which parameters' directions are specified as "out" or "inout". See Table 6 for a list of the keys in a successful response.

TABLE 6

Successful Response Dictionary Structure

| Key Name | Data Types | Contents |
| --- | --- | --- |
| output | list | A list of each resulting data set from execution |
| runtime | int | The runtime of the kernel execution |

Requests that encounter an error during the validation, handling, or execution phases generate an error response that is similar to the successful response structure. Error responses are serialized using JSON and are represented as a dictionary object at the highest level. The keys within the error dictionary map to a message which provides information about the error and an error code. The error code primarily functions to give additional information that can help determine where the error occurred. See Table 7 for a list of the keys in an error response.

TABLE 7

Error Response Dictionary Structure

| Key Name | Data Types | Contents |
| --- | --- | --- |
| message | string | A message explaining the error that occurred |
| errorcode | int | A code that helps locate the source of the error |

This architecture is constructed in such a way that multiple host clients have access to it and can send a request to the web service that will provide the data for execution and specify which kernel to execute. The process outlined here can be repeated with multiple host clients. Doing this may allow requests to be queued within the web service so that utilization of GPU hardware can be increased. Connecting multiple host clients to one remote system also eliminates the need to have a GPGPU device within each host client. This design meets the requirements as specified and lays out an architecture for building a solution to the known limitations of GPGPU computing.

A full implementation of the CUDA™ Web API can be built that satisfies the specified requirements and builds on the high level design found in the architecture. Implementation of the CUDA™ Web API requires a language, web framework, and access to the CUDA™ Driver API that are able to communicate easily. The web framework must be able to communicate with the CUDA™ Driver API in order to execute kernel functions when web requests are received. Additionally, the language used must be able to deserialize JSON and place it in a GPU memory as it would when using the CUDA™ runtime API. For this implementation, Python, Django, NumPy, and PyCUDA are chosen as the frameworks to build on because they allow their respective features to be used easily and are interoperable. Django allows easy creation of a restful web service that connects to multiple types of databases. The database allows the web service to maintain a stateful work queue and a list of available workers and their states when in multi-instance mode. This implementation uses a SQLite3 database but other DBMS systems could be used with Django. PyCUDA allows direct access to the CUDA™ Driver API and useful features for moving data to and from the GPU. Python does not have native arrays that are laid out in memory in the same fashion as C and CUDA™ C. NumPy is able to merge the gap between Python's representation of data, and how C and CUDA™ C represent data in memory by laying out data in memory in the same manner as C and CUDA™ C. The gap is then bridged by providing access functionality with Python. A discussion of this gap in further detail is provided in the data serialization section of this chapter. Other frameworks may be used for implementation, as well as depending on their ability to integrate these components.

The web server implementation exposes a set of paths to the web service, providing functionality to host clients. See Table 8 and Table 9 for a full list of server paths and their functionality. Paths not listed in the figure have no function and are redirected to the root path "/".

TABLE 8

List of Server Paths

| Path | HTTP Method | Function |
| --- | --- | --- |
| / | GET | Serves as the default page and contains links to the other parts of the web server. Attempts to access non-existent paths are redirected here. |
| /cuda/ | GET | Requests that have been submitted to this path using the POST method can be polled for status or for a response at this path. This path only has results when the server is set in multi-instance mode using a work queue. |
|  | POST | Receives requests containing the JSON-encoded request format. |
| /execute/ | POST | Exposed by workers in multi-instance mode for workhandlers to submit workloads for execution. The JSON format submitted to this path is similar to the request JSON format but contains additional data to assist in deserializing parameters. Client hosts should not submit any data to this path. JSON data is assumed to be pre-validated by the web server. |
| /status/ | GET | Used by work handlers when in the worker role to send a simple get request to determine if the worker is available at a basic level and able to complete web requests. This path returns an http response with the string "Up". |
| /server/ | POST | Used by worker machines to report to the web server on startup by posting data describing how the worker can be contacted. Workers post their URI, path for execution, and path for checking status. |
| /servers/ | GET | Returns the worker management page where remote workers\computer servers can be added, removed, and updated. |
|  | POST | Receives requests containing the JSON-encoded request format. |

TABLE 9

List of Server Paths (Cont'd)

| Path | HTTP Method | Function |
| --- | --- | --- |
| /configuration/ | GET | Returns a configuration page where the server can be switched between single-instance and multi-instance mode. |
|  | POST | Used by the configuration page to post changes to the mode. Returns the configuration page after processing POST data. |

TABLE 9-continued

List of Server Paths (Cont'd)

| Path | HTTP Method | Function |
|---|---|---|
| /client/ | GET | Returns a simple web UI that can be used to submit kernel requests. |
| /tutorial/ | GET | Returns a page containing a simple set of documentation describing the operation and use of the implementation of the CUDA ™ Web API. |

Each web request is received at the "/cuda/" path of the web server, where the body of the web request is retrieved and assumed to be the JSON encoded kernel request. If the request body cannot be deserialized or its structure is invalid, then a JSON encoded error response is created and returned to the client host. After deserializing the kernel request, the structure is validated ensuring that each field of the request dictionary is present and is of the correct type. Analysis is done on the request to determine if the parameters contain a collection of data, a scalar value, or are a complex struct type. The validated request is then added to the work queue database as a Django model.

Serialization and descrialization of request data is critical to the successful implementation of the CUDA™ Web API. Traditional CUDA™ programs are written using C and therefore their data layout in memory is determined by the implementation of the C compiler. Data that is operated on by a CUDA™ kernel must be memory copied from the host to device and back again and as such, CUDA™ GPUs have data laid out in memory in the same manner as traditional C programs.

One of the difficulties in implementing the CUDA™ Web API lies in taking the parameter data represented in JSON, and its structure definition string, and deserializing it such that the data is ultimately laid out in memory in the same way that it would be with a traditional C program. In order for a C compiler to lay out memory correctly, the C compiler must read in the structure at compile time and derive a scheme for aligning the data correctly in memory for access. Traditionally, serializing C data structs could be done using functions tailored for the data struct to perform serialization and deserialization. However, with the CIUDA™ Web API, the data structure must be read at runtime and deserialization and serialization of data must happen with a dynamic function that can use the runtime provided structure definition as a key to determine how data will be laid out in memory. This cannot be accomplished with the C compiler alone.

Python is able to deserialize JSON strings into dynamic objects as required for this implementation. However, since Python does not lay out data in memory in the same way as C and CUDA™, it is not possible to memory copy data from Python data structures to CUDA™ device memory. Python represents linear data structures as a list rather than in an array. NumPy is able to lay out data in memory as it would by the C compiler and can be easily accessed within Python. PyCUDA makes use of NumPy to layout data in host memory before copying it to device memory. Since JSON data can be easily converted to and from Python representations and data can be easily moved between NumPy representation and device memory, there is a clear path for serialization and descrialization. Inbound parameter data thus flows from JSON to Python to NumPy to CUDA™ device, and resulting data flows in reverse from CUDA™ device to NumPy to Python to JSON.

Libraries exist for transforming data between JSON and Python, and between CUDA™ and NumPy, and data should be easily transferable between Python and NumPy representation. However, this implementation encountered several problems trying to move data through both data flows to and from the CUDA™ device. NumPy has libraries that allow it to convert data from array layout to Python list layout and back. It accomplishes this by converting an array of a simple data type such as an "int" or "float" to a Python list of values. Converting data back is easily done by telling NumPy the type for each value it interprets. The difficulty in this transformation lies in transforming structured data. NumPy takes an array of structured data such as a struct with two "int" and two "float" and represents them in Python as a list of tuples, where each value in the tuple is in the same order as the fields listed in the NumPy data type. Giving this data to JSON creates problems because JSON does not distinguish between tuples and lists and represents both as lists. When the Python representation of the data makes a round trip through JSON representation, a list of lists is given. This presents a problem for NumPy which expects the data from structs to be given in a tuple. In order to overcome this obstacle, this implementation makes use of a function that converts the innermost list within a recursive list structure back into tuples. This function is only performed if the data type specified with the data parameter is a struct consisting of multiple data rather than a scalar data type. In order to make this distinction, a special analysis step is performed at the end of data validation when receiving a kernel request that serves to tell NumPy how to layout the Python represented data in memory. Performing these steps to move data from JSON to the CUDA™ device requires many steps and could be simplified as discussed in the future work section. The data serialization process only performs a shallow copy of the serialized data given with the request, and therefore, copying pointers to structures or arrays of pointers to structures results in copying pointers which do not point to valid data. In order to copy a pointer to a structure or an array of pointers to structures and the underlying structure data, a method for following the pointers to their source data and copying it is required. This type of deep copying is not provided in this implementation, and therefore pointers to structure and arrays of pointers to structures are not supported at this time.

A work queue is required when operating in multi-instance mode that tracks requests and acts as a stateful FIFO data structure. The stateful nature of the work queue requires that it exist outside of the web service due to the stateless nature of the web service. As a result, the work queue must be stored in a persistent data store 200. This implementation uses the Django model framework on top of a SQLite3 database in order to maintain state outside of the web service. Using the Django model framework allows easy integration with the web service and the rest of the CUDA™ Web API. In order to mimic the behavior of a FIFO queue data structure, the time at which the request is received is stored with the request. Each time a work item is pulled from the queue, the handler selects the request with the oldest received time to enforce the FIFO rule. This method ensures that no requests are left in the queue for an undefined amount of time. Handlers change the state of each item as they are processing the request and do not mark it as completed until the request is successfully completed or an error occurs. See Table 10 for a list of request states.

TABLE 10

Request States

| Status | Description |
| --- | --- |
| Queued | Request has been placed in the work queue and is awaiting execution |
| Inflight | A work handler has pulled the request from the work queue but has not yet found an available worker to process it. Inflight acts as a lock to prevent multiple execution of a single request |
| Executing | Request has been pulled from the work queue and is being executed by a worker. |
| Completed | Request has been executed by a remote worker and the resulting success or error is ready to be picked up by the remote client. |

All workers and the servers have the same method for execution. This allows the web service to operate in its single or multi-instance modes. This implementation uses PyCUDA in order to interact with the CUDA™ Driver API and CUDA™ compiler from Python. PyCUDA provides the necessary wrappers for CUDA™ and also handles memory copying data to and from the GPU device.

The first step in execution is to create a device context. The device context specifies which CUDA™ capable device on the executing system will be used for kernel execution. Only one device is used for each request per worker. However, it may be possible for a worker to handle multiple kernel executions at one time depending on the number of CUDA™ capable devices available to the worker. Any errors encountered while selecting a CUDA™ device cause an error response to be sent back to the sender detailing the cause of the error. It is possible to use a PyCUDA auto initialization to create the device context under normal circumstances but not when being used in conjunction with Django. Testing of the implementation across linux and OS X platforms reveals different errors, relating to the management of the CUDA™ context stack being either non-empty upon completion of execution or not containing the expected context references. As such, device contexts are handled manually to avoid errors.

Once CUDA™ device selection finishes, the request data, including grid and block size as well as kernel parameters, is retrieved from the request structure and stored. Each kernel parameter has already been pre-processed and given additional meta data to allow faster data deserialization. Each parameter is deserialized into a NumPy array or NumPy scalar type using the meta data. The system can construct arrays of scalar types limited to integers and single precision floating point numbers as well as arrays of simple structures also consisting only of integers and single precision floating point numbers as well as simple scalar types. Because of limitations encountered using NumPy, it is not possible to create single instances of structure types and as such passing structure types to the kernel function must be done using an array of size one. Using the array instead of a simple structure type does not create significant additional overhead for the system but does place a limitation on the programmer. Additionally, data specified as "out" or "inout" must be an array. As in typical C function calling, any parameter that will be modified by the function must be given using a pointer so that changes to the data persist after the function has been called. This implementation makes use of pointers to scalar types in this implementation and as such data that will be modified must be given as an array. Although structure types that will be modified by the kernel function must be given in an array, within the kernel code, the programmer can still address the structure type as if it were a point to the structure type rather than a pointer to an array of that structure type.

After data has been loaded and set up for kernel execution, the kernel code is JIT compiled and loaded onto the GPU. In order to set up the kernel, the NVCC compiler is invoked, producing a cubin file. Cubin files are a special binary output that when loaded on a GPU, provides the operations for the GPU to perform and are analogous to binary files output from other compilers. The resulting cubin file is loaded into system memory and then onto the CUDA™ device. Using JIT compilation with the NVCC compiler allows the kernel code to be sent in a form that is identical to any CUDA™ kernel compiled and executed using a local CUDA™ device. The kernel name from the request is used to specify which kernel function with the global attribute is the starting point in the kernel code similar to a kernel launch using the <<<grid,block>>> notation used in the CUDA™ Runtime API. This functionality is accomplished by using the CUDA™ Driver API calls cuModuleLoad( ) and cuModuleGetFunction( ). The kernel is then launched with the parameters loaded into GPU memory using the cuLaunchKernel( ) call from the CUDA™ Driver API. In order to accomplish these steps in python, this implementation uses PyCUDA which wraps these steps and function call into two lines.

SourceModule( ) wraps the compilation and module loading steps and returns the module in a python wrapper. The module represented in python then has a function get_function( ) which retrieves a function that wraps the kernel launch function. This implementation then uses the function provided by PyCUDA from the get_function( ) call with the appropriate deserialized NumPy data parameters to launch the CUDA™ kernel. After execution, parameters wrapped with the PyCUDA "out" or "inout" types are copied back from the GPU into CPU memory and accessible from their NumPy arrays. The resulting set of CUDA™ Driver API function calls follows the same flow as that shown in the CUDA™ C Programming Guide.

Data retrieved from the GPU is collected into a list of all response data and then serialized into a response structure using JSON. Runtime data is also collected and added to the response, giving the programmer additional metadata to measure performance increases in their kernel. The CUDA™ device context is cleaned up at this stage to free the device for later kernel executions. Finally, the JSON serialized response is returned and execution is complete.

Results are handled differently at the end of computation depending on mode of operation. In single-instance mode, results are returned to the client immediately after execution without being stored in the database. Under multi-instance mode, results from execution are stored in the database and associated with their respective stored request. Client hosts are able to retrieve requests by issuing a GET request to the web service at the appropriate path with the ID of the request. The request ID is given to the client host during the request submittal phase in multi-instance mode. Clients can get the result of their request from the web service when request execution has finished. If a request has not been executed or is still in progress, the client is given a status update indicating if the request is waiting for an able worker or being executed. Clients are not notified when requests have been executed and are required to poll the web service to get the response. It is possible to add callback functionality to the web service as discussed in the future work section but is not part of the web service at this time.

Operating the web service in multi-instance mode requires the use of workers to handle requests. In multi-instance mode, the server hosting the web service does not execute requests directly. Instead, the server adds the request to a work queue from which requests are selected and dispatched to workers. Each worker is then responsible for the compilation of kernel code included in the request, deserialization of parameters, execution of the request, and return of the response back to the work dispatcher. Workers are required to have a CUDA™ capable device in order to handle requests but workers are not required to have identical hardware. Additionally, workers must have the NVCC compiler in order to perform JIT compilation using PyCUDA. Execution on each worker is performed in the same way as on the server when operating in single-instance mode. Workers run the same application as the server and expose the same web service paths as the server. However, workers are only contacted using the execute and status paths of the web service. Other paths of the worker should not be used and each worker should not be treated as host for the public web service in the same way as the server hosting the web service. Using a worker paths outside of execute and status path can create several problems such as: discrepancies in the data store of the worker which should not exist, interrupted request workflows resulting in failed request execution, or possibly user confusion as a result of looking for data stored in the sever on a worker machine. Using alternate worker paths can also result in multiple data stores containing completed requests and subsequently causing further confusion when debugging. The same application is used for both server and worker roles in order to maintain a simple system with a common code base.

The list of available workers is kept in a database. Each worker is tracked by its URI, and additional metadata regarding web service paths where the worker can be contacted and the last time the worker was contacted. Workers are chosen by the request dispatchers by selecting the available worker with the oldest update time. Choosing the worker with the longest idle time allows the database to act as a LILO datastructure and ensures that all workers are used equally. See Table 11 for a list of information stored for each worker.

TABLE 11

Worker Information

| Data | Description |
|---|---|
| (Uniform Resource Identifier) URI | The URI used to contact the worker. Can be an IP address or domain name. Concatenated with status path and execute path to contact the worker. |
| Status Path | Web service used by work dispatcher to determine if worker can be contacted. |
| Execute Path | Web service path where request data can be sent in specified internal format for execution. Different from the path used by client hosts to access public API. |
| status | Available for request handling or busy while executing request. |
| updated | Time stamp from the last action involving the worker. Includes: startup, request dispatch, response received |

Requests are dispatched to workers by work handlers that are responsible for pulling unexecuted requests from the work queue and sending them to an available worker. Work handlers operate in their own process and are initialized each time a new request comes in, or a new worker is added to the list of workers. Each handler remains active as long as there is work in the work queue and an available server to perform execution. Handlers that start and do not find work in the work queue, or do not find an available server will cease functioning and leave further handling to other handlers. This ensures that at least one handler is active while there are requests in the work queue and an available worker. Handlers are responsible for updating the status of the request they are processing and the status of the worker that is executing a request.

When selecting a request, the handler immediately updates the status of the request to prevent other handlers from selecting the same request and duplicating execution. The status of the worker is updated by the handler immediately after finding an available worker to prevent overloading a single worker. Once the worker and request have been selected from their respected queues, the handler submits the request to the worker and waits for the response. Handlers send data to workers using a JSON structure similar to the structure listed in Table 1 with additional metadata from the stored request that simplifies the deserialization process.

After the worker has finished executing the request and responded to the handler, the handler stores the successful or error response in the database for retrieval by the client host. The handler then releases the worker by updating its status as available and changing its last updated time. Releasing the workers after execution helps to distribute requests among all available workers. Handlers repeat this process until there are no requests remaining in the work queue or there are no available workers.

Regarding the client-user interface, a simple client application is used in order to demonstrate how an application can connect to the CUDA™ web service, build requests and send them using JSON. This application is built using HTML and Javascript for data processing, sending, and handling. Client hosts are not required to use this application to submit data, but it demonstrates the ability to use CUDA™ from a domain that is not typically associated with CUDA™. This application is titled CUDA™ Cloud and allows a user to enter kernel code in the browser as well as JSON formatted parameters, submit them and see the result. CUDA™ Cloud is not meant as a front end for doing intense computation but could be useful for demonstrating how to write CUDA™ kernels and to quickly test or prototype kernels. This application uses the CodeMirror syntax highlighting text area for the kernel code text area and parameter text areas. C syntax highlighting and JSON syntax highlighting allow users to more easily work with CUDA™ kernels and parameter data. Request data is validated and structured using javascript. Each request is submitted to the web service using AJAX post. Resulting data is displayed without needing to refresh the interface once the AJAX call has returned. As shown in FIG. 3, CUDA Web Service screenshot 300 of the CUDA™ Cloud web client application includes a Web Client page 302 detailing Kernel Code, Name, Grid Dimensions, Block Dimensions, and Arguments.

The exemplary implementation is built on and has the following requirements\prerequisites for operation. All operating systems are supported provided that they have the tools listed installed. This implementation requires specific versions of the tools listed. Newer versions of these tools may exist but have not been tested. The system running the web service or workers must contain a CUDA™ capable device with compute capability 1.0 or higher depending on requirements of the kernels submitted. Although this implementation is built using the CUDA™ 4.2 toolkit, it may be possible to use an older toolkit but this has not been tested. This list of prerequisite tools for this implementation is as shown in Table 12.

TABLE 12

Tools For Implementation

Python 2.7
CUDA ™ Toolkit 4.2 or higher
Django 1.3.1 or 1.4
PyCUDA 2011.2.2
NumPy 1.6.1
httplib2 0.7.2

To begin installation, a copy of the web service implementation source code is obtained. This serves as the basis for both the web service and the compute workers when operating in multi-instance mode. Startup of the system is performed by running the following command in a command line terminal. This is the same command used to start other Django applications. Set the current directory to the root directory of the application where the manage.py file is located. Run the following command where 1.1.1.1 is the IP address desired for operation and 80 is any port desired. For example, "python manage.py runserver 1.1.1.1:80". Deployment is only supported using the Django development web server at this time. However, it could be possible to use other web servers in the future.

With respect to worker startup, when operating in multi-instance mode, workers are tracked using the persistent worker queue in the database. Workers can be added to the web server's worker queue by using the Web UI or by making an HTTP POST to the web server. In order to add a worker to the system at runtime using the HTTP POST method, an HTTP POST must be made with a JSON encoded dictionary containing information about how to contact the worker. This dictionary must include the worker's URI, web service path used to check status, and web service path used to post requests for execution. See Table 13 for a description of the JSON dictionary structure used with HTTP POST method.

TABLE 13

Worker POST Dictionary Structure

| Key Name | Data Types | Contents |
| --- | --- | --- |
| uri | string | The URI of the worker. Must be reachable by the web server\handlers. |
| statuspath | string | Web service path on the worker that returns a small HTTP response to check functionality. |
| executepath | string | Web service path on the worker where requests can be sent for execution using an HTTP POST. |

Additionally, new workers can be added to the web servers worker queue be entering them manually using the CUDA™ Cloud web client application's worker/compute server management page 304 of CUDA Web Service screen 300, as shown in FIG. 4. The server's management page shows all workers/compute servers registered in the system and their current status. To remove or change the status of a worker, the web UI has buttons associated with each worker/compute server to perform each action, respectively.

The server can be configured to host the web service in either a single-instance mode or multi-instance mode as discussed in the implementation chapter. The default mode of operation is single-instance but can be changed before or during runtime. The operational mode can be changed in two ways. The first way to change the mode is by using the configuration file in the root directory of the cudawebapiproj project folder, named settings.py. For operational mode, the default setting in the configuration file is SINGLE_INSTANCE=True. In order to change the operational mode of the server to multi-instance mode, the value associated with SINGLE_INSTANCE must be changed to False. Changing the configuration file yields SINGLE_INSTANCE=False. Additionally, see Table 14 for a simplified list of operational modes and their corresponding values within the configuration file.

TABLE 14

Configuration File - Operational Settings

| Operational Mode | SINGLE_INSTANCE value |
| --- | --- |
| Single Instance | True |
| Multi Instance | False |

Figure 5:
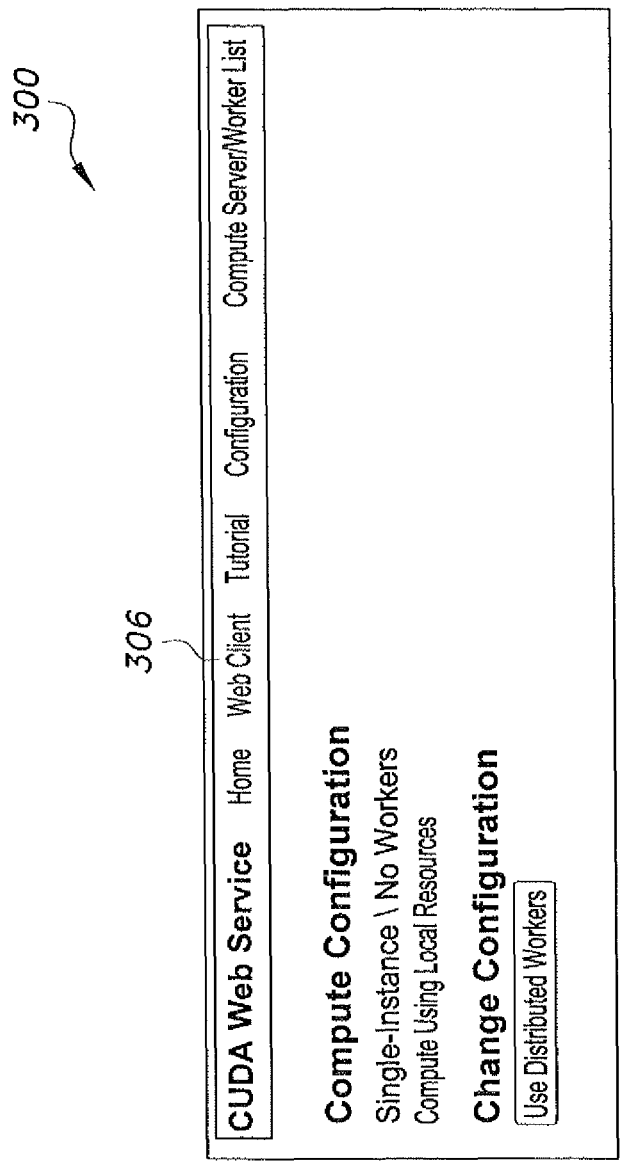
FIG. 5 is a screenshot showing a configuration page in a remote GPU programming and execution system according to the present invention.

The mode can also be changed at runtime using the web UI. The web UI for configuration can be found at the \configuration\ path of the server as listed in the path Table 9 in the implementations section. FIG. 5 shows a screenshot of the configuration page 306.

Toggling the operational mode between single-instance and multi-instance at runtime is not recommended by the Django documentation, because the value toggled is part of the configuration file. Changing the operational mode at runtime does not permanently modify the configuration file, and subsequently the server will start up in whichever mode is specified in the configuration file. Since the server persists requests in multi-instance mode and not in single-instance mode, all requests are removed from the database when switching the server from multi-instance mode to single-instance at runtime.

With respect to the API, Client applications must submit all requests to the web server at the \cuda\ path using the HTTP POST method. When operating in multi-instance mode, the client can retrieve a processed request from the \cuda\ path by using and HTTP get request with the ID of their request.

A strict request format must be used to submit a request to the web service for execution. The example in Table 2 shows the structure of a valid request used for matrix multiplication. See Table 4 for examples of the data types that can be passed as parameters to the request.

Successful results from the web service as a result of request execution are returned in a very strict format. These result formats must be correctly handled by the originating client host to retrieve computed data. A complete valid response is shown in Table 16. Output data is returned in a list. Table 15 shows a valid JSON encoded request without kernel code. Table 16 shows one set of output data that is a 2 dimensional array of floats.

TABLE 15

Valid JSON-Encoded Request without Kernal Code

{"kernelname": "compute",
"grid": {"y": 1, "x": 1},
"code": "...",
"params": [
{"direction": "in", "data": [[0.0, 1.0], [2.0, 3.0]], "struct": "float32"},
{"direction": "in", "data": [[0.0, 1.0], [2.0, 3.0]], "struct": "float32"},
{"direction": "out", "data": [[0.0, 0.0], [0.0, 0.0]], "struct": "float32", "size": [2, 2]},
{"direction": "in", "data": 2, "struct": "int32"}
],
"block": {"y": 1, "x": 128, "z": 1}}

TABLE 16

Valid JSON-Encoded Response

{"totaltime": 1111, "output": [[[2.0, 3.0], [6.0, 11.0]]], "runtime": 1111}

In order to handle only the response data, data must be retrieved from the result dictionary using the output key and then the matrix must be pulled from the output list of data. Since the output data list only contains one item, the first and only item from the list is the resulting data. It is important to retrieve data from the output list only and not move deeper into any lists contained in the output data list. This is an important step during use which could easily be overlooked during use resulting in difficult bugs. Traversing the data deeper than the first list to retrieve complete data sets could corrupt data during retrieval. Should a user traverse the data structure incorrectly, debugging could be very difficult depending on the structure and type of the output data. As an example, incorrect traversal of the data structure could result in interpreting a two dimensional matrix of floats as a two dimensional matrix of structures consisting of multiple floats.

In order to determine where errors occur during execution, the server provides an error code in error responses. Each error code has a specific meaning and origin that assists debugging on both client and server sides of a request. See Table 17 for a list of the error codes, meanings, and next step actions for users.

TABLE 17

Error Codes and Definitions

| Error Code | Description | Programmer Action |
|---|---|---|
| 1 | Invalid JSON | Check JSON formating to verify conformity to JSON standard. |
| 2 | Invalid Request Structure | Check request dictionary for required keys, key names and data types. |
| 3 | Invalid Parameter Structure | Check parameter dictionary as specified in error message for required keys, key names, and data types. |
| 4 | Deserializing Error | Check parameter data to verify conformity to JSON standard. Verify complex structs are represented as JSON comma (,) separated lists. |
| 5 | Parameter Error (direction) | Check parameter direction to verify value of "in", "out", or "inout". |
| 6 | Kernel Code Error | Check kernel code for syntax errors. Read error message for NVCC compiler output. |
| 7 | CUDA ™ Execution Error | Read error message for information regarding error. |
| 8 | Serialization Error | Check return data type specification and kernel for mutual conformity. |

Performance is calculated by running an existing function with a serial implementation, parallelization with standard CUDA™, and parallelization with the CUDA™ web service to determine runtimes. Runtime for the CUDA™ web service should show noticeable improvements over the serial implementation. Additionally, a difference between the standard CUDA™ implementation and CUDA™ web service implementation should be enough to account for network overhead but still be minimal. Some fixed overhead is also expected when using the CUDA™ web service, as with memory overhead encountered with standard CUDA™.

A simple matrix multiplication algorithm was utilized to evaluate performance of the system. Matrix multiplication using square matrices is a well-known algorithm with resultant data that is not interdependent on itself, and therefore benefits from CUDA™ parallelization. Five different implementations for matrix multiplication are created using combinations of Python, C, and CUDA™ as shown in Table 18.

TABLE 18

Evaluation of Implementations

| Implementation | Processor |
|---|---|
| C | CPU |
| CUDA ™ C | GPU |
| Python | CPU |
| Python with PyCUDA | GPU |
| Python with CUDA ™ Web API | GPU |

The first two implementations are simple serial implementations using both Python and C to set a benchmark for performance and correctness. Two additional implementations using Python and CUDA™ are built using Python with PyCUDA and Python with the CUDA™ web service. All Python implementations have data stored using NumPy arrays that lay out data in memory in the same way as C. Finally, the last implementation is written using C and traditional CUDA™ C. The CUDA™ C implementation provides a benchmark for standard CUDA™ performance. Exemplary matrix multiplication code is show in Table 19.

TABLE 19

Exemplary Matrix Multiplication (CUDA ™)

```
__global__
void multiply(float *array1,float *array2,float *array3,int size)
{
    for(int tid = threadIdx.x + blockIdx.x * blockDim.x;
        tid < size * size; tid += blockDim.x * gridDim.x)
    {
        int x = tid % size;
        int y = tid / size;
        float sum = 0;
        int i;
        for(i = 0; i < size; i++)
        {
            float a = ;
            float b = array2[x + i * size];
            sum += array1[i + y * size] * array2[x + i * size];
        }
        array3[tid] = sum;
    }
}
```

Data is collected with these implementations using square matrices starting with two dimensional matrices of size 5 in each dimension (25 elements) and increasing by 5 in each dimension, ($5^2$ elements) up to a maximum of 120 in each dimension for Python implementations and 250 in each dimension for C implementations. The end matrix size is different for each implementation as a result of the performance differences between using C and Python. The goal is to demonstrate the point at which the data to be operated on is large enough or requires sufficient computation to realize a performance increase using a GPU. In this case, matrices for size 120 and 250 in each dimension are sufficient to show the performance increases from using GPUs with Python and C respectively. Data is collected for each input matrix size ten times.

The CUDA™ Cloud web client application is also used in order to assess usability and general viability of the web service as a platform for CUDA™ computation.

All tests are run on a system using an Intel Core i7 processor at 2.66 GHz and an Nvidia GeForce GT 330M. The NVCC compiler is used for all C and CUDA™ C implementations. Tests running a remote client host and web service server separately used the same Intel Core i7 system as the server and a system with an Intel Core 2 Duo at 2 GHz as the client with data sent over a gigabit Ethernet network.

Functionality is measured by the web service's ability to produce the same output from the same input data using matrix multiplication. Each input matrix has preset data with values starting from 1 and incrementing by 1 to a maximum value of $N^2$ where $N^2$ is the size of the square matrix. Resulting matrices computed using the CPU and GPU implementations are equal up to size 30 in each dimension with Python implementations and up to size 60 in each dimension with C implementations. After these points, maximum value differences grow as the maximum value input matrices grows with matrix size. Differences are seen between the C and CUDA™ C implementation as well as between Python and PyCUDA\CUDA™ Web API implementations. Values from PyCUDA and CUDA™ Web API implementations are equal in all cases as expected since this implementation of the CUDA™ Web API uses PyCUDA. These differences in values can be explained by the loss in precision with floating point values due to different ALU architectures between the CPU and GPU. Although the CUDA™ Web API yields different values with large numbers when performing floating point arithmetic, matrices of smaller size yield constantly equal results. This suggests that the CUDA™ Web API does not alter CUDA™ kernel functionality and performs in the same way as traditional CUDA™ C kernels.

The GPU matrix multiplication implementations are able to produce resulting matrices with equal results as shown in the functionality validation. Each of the GPU implementations has one CUDA™ kernel that performs the matrix multiplication algorithm. All of the these kernels have the same CUDA™ kernel code which can be seen in the Appendix. As a result, we see that it is possible to use the same CUDA™ kernel with the CUDA™ web service as is used in a CUDA™ C implementation. This fulfills the requirements laid out in the architecture for the CUDA™ Web API and shows that transition from local CUDA™ to use of the CUDA™ web service is a viable option for using CUDA™.

The CUDA™ web service requires that data be sent in a specific JSON encoded format. This format allows the web service to correctly handle CUDA™ data and perform remote compilation and execution. The CUDA™ Web API implementation of the matrix multiplication program is able to meet this requirement without the need to communicate directly with the GPU or the CUDA™ toolkit. This shows that it is possible to make use of CUDA™ without the need to be directly connected to GPGPU resources. Using this system, programmers can make use of CUDA™ and achieve equal results as they would with local GPGPU resources.

Performance is measured by the web service's runtime when compared to CPU and standard GPU implementations. CUDA™ kernels have greatly improved runtimes over CPU implementations but have a fixed runtime overhead associated with GPU memory handling. GPU memory overhead is a result of the time necessary to allocate GPU memory, copy data from CPU memory to GPU memory, copy data back from GPU to CPU memory, and free GPU memory for future use. The added overhead from GPU memory handling creates a point at which it is more efficient to perform computation using the CPU rather than the GPU. The CUDA™ web service has additional overhead associated due to the time required to descrialize and manipulate request data. In order for the CUDA™ web service to be effective, there must be a point at which computation is completed faster using the CUDA™ web service than with local CPU computation.

In the case of CPU implementations, runtime is calculated as the time it takes to multiply two matrices but not the time to set the data within the matrices. CUDA™ C runtime is calculated as the time it takes to allocate memory on the GPU, copy input matrices onto the GPU, perform the GPU matrix multiplication, copy the resulting matrix from the GPU, and free GPU memory. For the PyCUDA implementation, runtime is measured as the time it takes CUDA™ to compile the kernel code in addition to the operations performed using CUDA™ C. Runtime of the CUDA™ web service is calculated from a host client that submits a request for matrix multiplication accompanied by the input matrices as the time it takes for the request to be created and sent, and for a response to be received and deserialized.

GPU kernel execution time is faster than CPU execution time in all cases. However, total runtime including memory operations for the GPU is slower than the C implementation for small matrices and faster for large matrices. This shows that the overhead associated with GPU memory operations is overcome if the workload is large enough. The transition point for efficiency in this case happens with two dimensional matrices of approximately 85 elements in each dimension in size.

Figure 6:
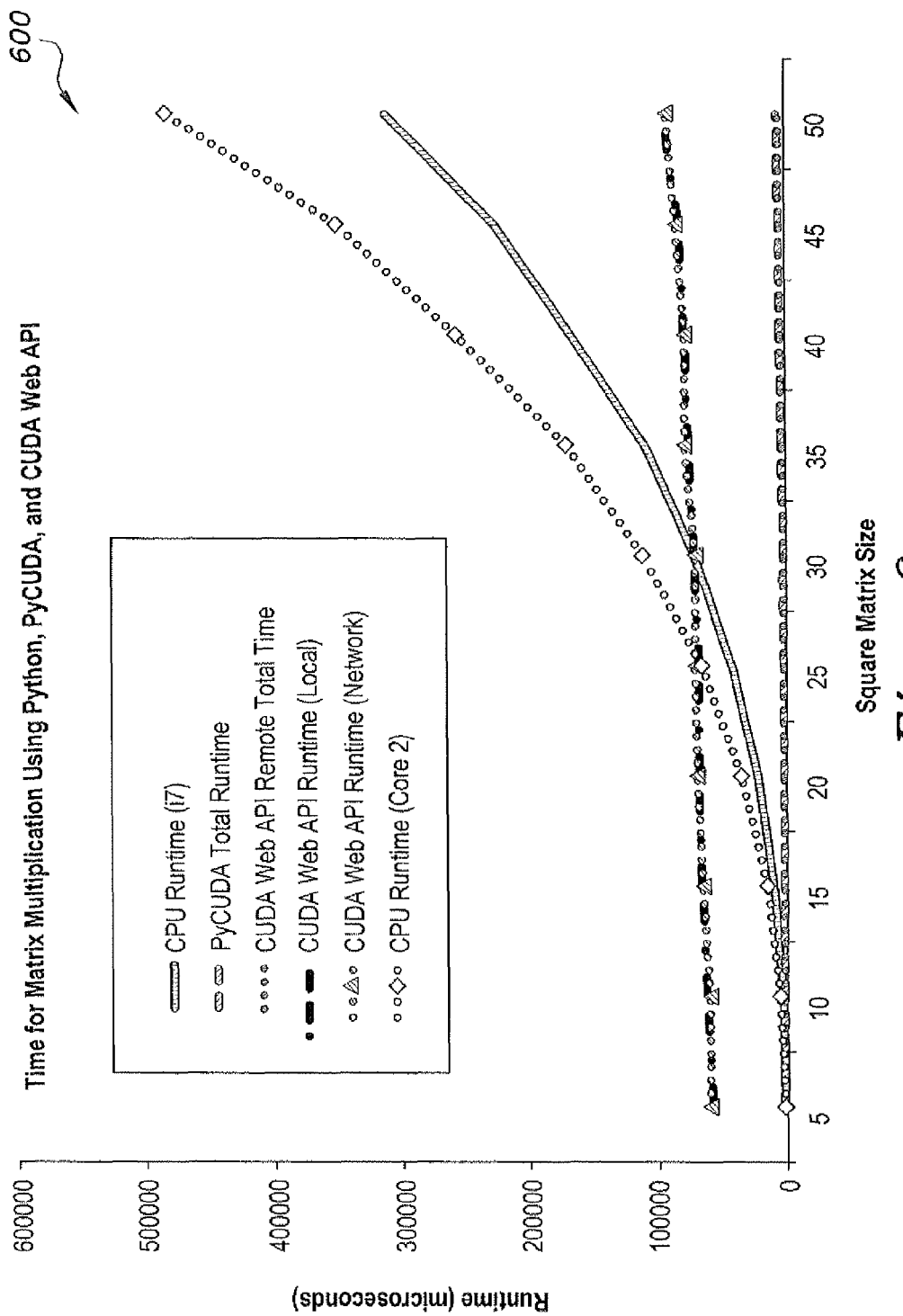
FIG. 6 is a plot showing performance of the remote GPU programming and execution system according to the present invention.

Data from the Python implementations exhibits a similar pattern and is shown in plot 600 of FIG. 6. The runtimes of the CPU implementation of matrix multiplication with Python increase exponentially as input matrix sizes increase just as with the C CPU implementation. The local PyCUDA implementation of matrix multiplication shows only a slight increase in runtime with an increase in input matrix size. The execution phase of the CUDA™ web service shows nearly identical runtime as the local PyCUDA implementation as would be expected due to the CUDA™ web service's use of PyCUDA during the execution phase. More interestingly, runtime for the CUDA™ web service is significantly greater in all cases than the PyCUDA implementations but shows the same increase in runtime as the input matrices increase in size. The increase in runtime in this case shows how much overhead is added by the need to serialize the request, send it to the web service, deserialize the request, execute the kernel and follow the same process backwards to the client host. Performance tests done using the gigabit Ethernet connection between separate server and client systems show approximately the same runtimes as those done locally where the server and client system are collocated within the same machine.

Overhead involved in using the CUDA™ web service results in slower runtimes than the CPU implementation with small input matrices. However, the quadratic growth of the CPU implementation results in faster runtime using the CUDA™ web service than the CPU implementation with larger input matrices. A crossover is seen in plot 600 with two dimensional input matrices with size of approximately 30 in each dimension. This shows that in cases with large amounts of computation to perform, that the CUDA™ web service provides significant performance increase over using a CPU implementation. Although network traffic was minimal, the tests using separate server and client systems show that the added overhead associated with moving data over the gigabit network is negligible. As such the CUDA™ web service meets architectural performance requirements shown earlier. Additionally, we see that using web services to perform remote execution of CUDA™ kernels is viable from a performance perspective.

The results of this analysis show that it is possible to create a system which enhances the GPGPU's abilities and minimizes their requirements. Building such a system shows that it is possible to reduce costs associated with GPGPU programming by increasing utilization and decreasing hardware requirements. Using existing CUDA™ and PyCUDA technologies allow the programmers to use the system without adding significant additional complexities or barriers to entry. There is a need for better tools to use in conjunction with GPGPU programming and this architecture should present itself as a viable alternative to existing tools and frameworks.

This implementation of the CUDA™ web service uses NumPy, Python JSON libraries, and some manipulation in order to descrialize and serialize data coming into and out of the CUDA™ web service. Since NumPy is not available for all other languages, this implementation cannot be copied directly in another language. Ideally, it should be possible to implement the architecture put forth in any environment or language that has bindings to the CUDA™ Driver API. In order to do this without rewriting significant pieces of code, a common library for data serialization is needed.

Existing JSON libraries use the CPU in order to read serialized data and lay it out correctly in memory. Datasets used for GPU computation tend to consist of large sets of individual values with the same format. These types of datasets could be de-serialized on the GPU using a CUDA™ kernel in order to achieve better runtimes with the CUDA™ web service. A CUDA™ kernel used for deserialization would receive the serialized string representation of data used for computation and deserialize each element of the dataset using an individual thread, while determining the actual data type using a map that provides the type of each element in the dataset. Using a CUDA™ kernel for deserialization would allow the CUDA™ web service to bypass other data handling libraries. Additionally, using a CUDA™ kernel for serialization and deserialization would allow greater portability of each implementation of the CUDA™ Web API.

Operating in multi-instance mode with this implementation of the CUDA™ web service requires a client to submit a request and then poll the web service for a response until it is ready. In order to minimize unneeded traffic talking to the web service, it would be better if the web service was built using a mechanism that allowed the web service to report results to the client host when processing is finished. This could be accomplished by allowing the client to provide the URI of a web service within the request that would be used by the CUDA™ web service to submit the response upon completion of the request.

This implementation of the CUDA™ Web API shows benefits in performance and ability to simplify barriers to entry in using CUDA™. Although the performance tests show a benefit from use, it may be possible to lower the overall runtime associated with using the CUDA™ Web API. This may be done by streamlining data serialization, request processing, using a more intelligent work handler algorithm, or using multiple GPUs on the same worker to process requests in parallel.

The CUDA™ Web API architecture puts forth an interface for using CUDA™ with a well-defined web service. While the implementation presented here meets the requirements set forth, it is not necessary for this implementation to be written using a specific language or CUDA™ Toolkit. In order to meet the requirements of the architecture, it is necessary to use a language and CUDA™ binding that bridge the gap between the web service interface with its data serialization format and the GPU with its memory layout. This could be accomplished with another language and toolkit provided that data serialization can be done in a way that is language independent as with the CUDA™ kernel discussed earlier in the data serialization future work section. Using another language or toolkit may provide better runtime performance and reduce the overhead associated with using the CUDA™ web service. Reduced overhead could decrease the input data size needed to realize performance improvements from using the CUDA™ web service instead of CPU computation. An alternative implementation would not change the forward facing interface of the web service and as such not require any changes by the client host.

It is to be understood that the present invention is not limited to the embodiments described above, but encompasses any and all embodiments within the scope of the following claims.

I claim:

1. A remote GPU (Graphics Processing Unit) programming and execution method, comprising the steps of:
   executing an Application Programmer Interface (API) on a Web server in operable communication with a client host, the Web server communicating via a Web service with a CPU (central processing unit) associated with a GPU;
   receiving from the client host at the API a user-specified serialized GPU kernel program and a user-specified serialized data set to be operated on by the GPU kernel program;
   formulating GPU memory copying and GPU memory allocation instructions by the API as a portion of the user-specified serialized data set, the copying and allocation instructions including determinations designating individual items of the data set as being from the group consisting of input data, output data, and both input and output data, the instructions facilitating placement of the data set in a data storage memory of the GPU;
   sending the user-specified serialized GPU kernel program and the user-specified serialized data set from the API to the CPU via the Web service, the GPU executing in parallel the deserialized GPU kernel program over the deserialized user-specified data set to produce a result of the GPU kernel program execution;
   receiving a responsive communication from the CPU at the API, wherein said responsive communication from said CPU comprises a polling ID associated with processing of said GPU executing in parallel said deserialized GPU kernel program over said deserialized dataset, said polling ID allowing said client host to poll for readiness of said GPU kernel program execution result; and
   forwarding the responsive communication from the API to the client host.

2. The remote GPU programming and execution method according to claim 1, wherein said responsive communication from said CPU comprises a serialized said result.

3. The remote GPU programming and execution method according to claim 1, wherein said communication via said Web service utilizes hypertext transmission protocol (HTTP).

4. The remote GPU programming and execution method according to claim 1, wherein said serialized kernel program and dataset are in a JavaScript Object Notation (JSON) serialized format.

5. The remote GPU programming and execution method according to claim 1, further comprising the steps of:
   said Web server running in a multi-instance mode allowing requests from said client to be allocated to GPU equipped remote workers;
   storing said requests in a work queue to be executed by said GPU equipped remote workers;

removing unprocessed jobs from said work queue;

serializing said unprocessed jobs in a format with additional data for parameter deserialization by said GPU equipped remote workers;

sending said serialized unprocessed jobs to said GPU equipped remote workers for execution; and accepting from said client host a URI of a web service within each request, said Web server sending said result to said URI upon completion of said each request.

6. The remote GPU programming and execution method according to claim 5, wherein at least one of said remote workers is equipped with multiple GPUs.

7. The remote GPU programming and execution method according to claim 1, further comprising the steps of:

said Web server running in a multi-instance mode allowing requests from said client to be allocated to GPU equipped remote workers;

storing said requests in a work queue to be executed by said GPU equipped remote workers;

removing unprocessed jobs from said work queue;

serializing said unprocessed jobs in a format with additional data for parameter deserialization by said GPU equipped remote workers; and sending said serialized unprocessed jobs to said GPU equipped remote workers for execution.

8. The remote GPU programming and execution method according to claim 7, wherein at least one of said remote workers is equipped with multiple GPUs.

* * * * *